Jan. 28, 1941.　　　　P. KLAMP　　　　2,230,049
TRANSMISSION DYNAMOMETER
Filed Oct. 1, 1937
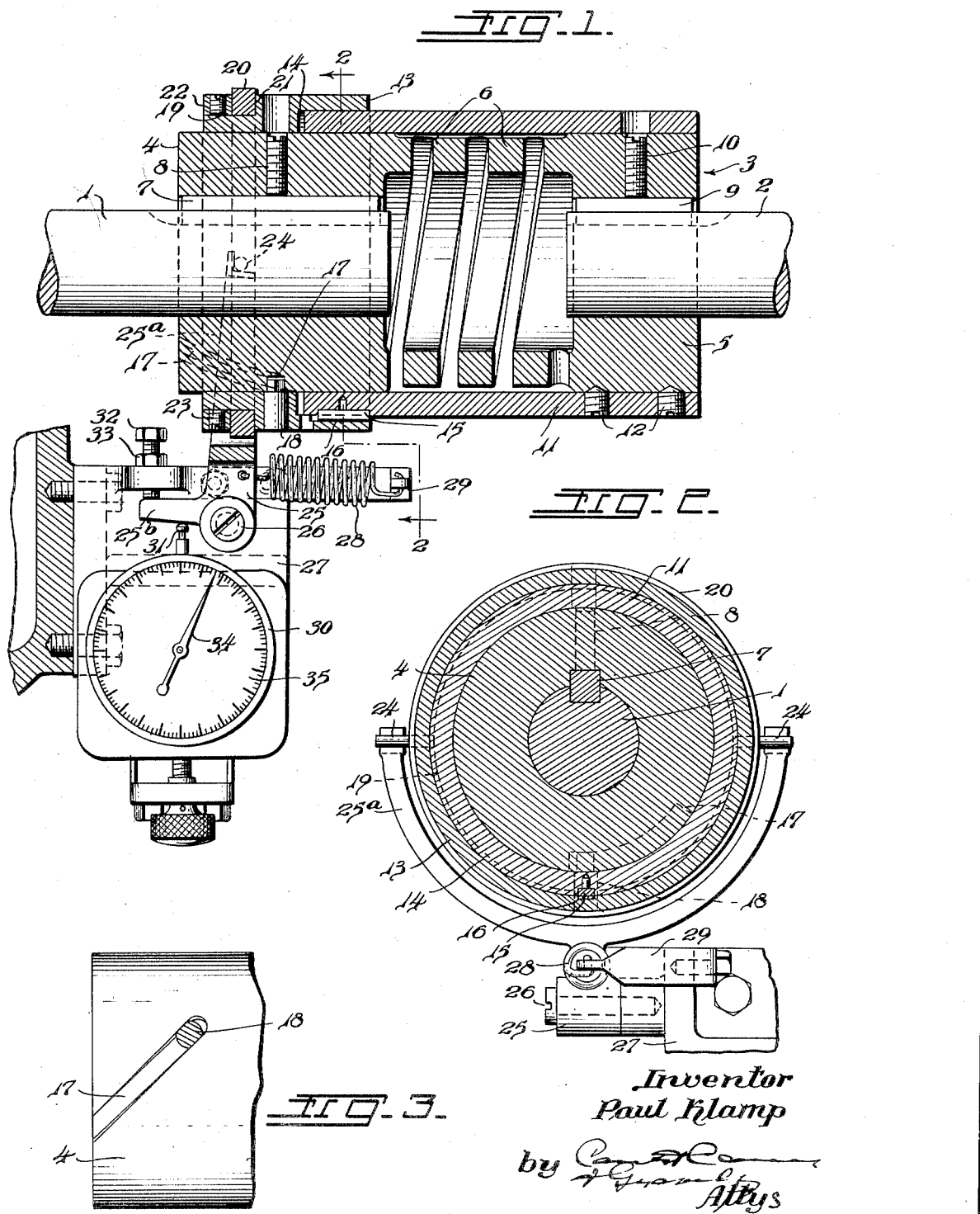
Inventor
Paul Klamp Patented Jan. 28, 1941

2,230,049

UNITED STATES PATENT OFFICE 2,230,049

TRANSMISSION DYNAMOMETER

Paul Klamp, Canton, Ohio, assignor to The Timken Roller Bearing Company, Canton, Ohio, a corporation of Ohio Application October 1, 1937, Serial No. 166,753

5 Claims. (Cl. 265—25)

This invention relates to dynamometers, particularly dynamometers of the kind wherein the power is transmitted from a driving shaft to a driven shaft through a torsion spring coupling that actuates a device for indicating the torsional resistance to rotation of the driven shaft, according to the load thereon.

It has for its principal objects to produce a device of the above type that is accurate, simple, economical and compact, that is not likely to get out of repair, that is easily calibrated, and that will embody other advantages hereinafter appearing. The invention consists in the parts and in the construction, combination and arrangements of parts hereinafter described and claimed.

In the accompanying drawing, which forms part of this specification and wherein like symbols refer to like parts wherever they occur, Fig. 1 is part side elevation and part vertical longitudinal sectional view of a torque indicating device embodying my invention;

Fig. 2 is a transverse cross-section on the line 2—2 in Fig. 1 through the drive shaft end of the torque coupling; and Fig. 3 is a fragmentary side elevational view of the drive shaft end of said coupling, showing the oblique cam groove in the outer face thereof.

My torque indicating device comprises axially alined, longitudinally spaced drive and driven shafts 1 and 2, respectively, that are connected at their adjacent ends by a torque coupling 3. Said coupling comprises a cylindrical body having axially bored shaft receiving end portions 4 and 5 and a counterbored intermediate portion of slightly reduced outside diameter that is milled helically to form a torsion coil spring connection 6 between and integral with said shaft receiving end portions. The drive shaft 1 is rigidly secured in the bore of the end portion 4 of the coupling 3, preferably by means of a key 7 and a set screw 8; and the driven shaft 2 is likewise rigidly secured in the bore of the other end portion 5 of said coupling by means of a key 9 and set screw 10.

Mounted on the torque coupling 3 is a hollow cylindrical casing or sleeve 11 that is rigidly secured at one end to the driven shaft receiving end portion 5 of said coupling, preferably by set screws 12, and has its opposite end portion supported on, but otherwise disconnected from, the drive shaft receiving end portion 4 of said coupling. Mounted on the drive shaft receiving end portion 4 of the torque coupling opposite the corresponding end of the sleeve 11 is a collar 13, whose inner end is counterbored, as at 14, to receive said end of said sleeve. The counterbore engaging portion of the sleeve 11 has a key 15 fixed thereto that slidably engages a keyway 16 provided therefor in said counterbore, thereby preventing relative rotary movement of said sleeve and said collar, but permitting relative axial sliding movement thereof. The end portion 4 of the torque coupling has a cam groove 17 formed in the outer surface thereof that extends at an oblique angle to the coupling axis and is adapted to receive the flat-sided inner end of a pin 18 that is fixed to the collar and extends radially inwardly therefrom.

The outer end portion of the collar 13 is reduced to form a shouldered seat 19 for a thrust ring 20 which is held against axial sliding movement on said seat between a shoulder 21 formed thereby and a retaining ring 22 that is sleeved on said seat and is rigidly secured thereto, preferably by means of set screws 23. The thrust ring 20 is provided with a pair of diametrically opposed outwardly extending pins or trunnions 24 that are adapted to engage the free ends of the branches of the yoke arm or fork 25a of a lever 25. This lever is mounted for vertical swinging movement transversely of the axes of the trunnions 24 of the thrust ring 20 on a horizontal pivot 26 fixed to the front face of a suitably supported bracket 27; and the yoke arm 25a of said lever straddles said thrust ring and is yieldably held in engagement with said trunnions by means of a helical tension spring 28 that has one end secured to said arm and its other end secured to a support 29 that is bolted or otherwise rigidly secured to the rear face of said bracket.

The lever supporting bracket 27 also supports a suitable dial indicator 30 having an actuating plunger 31, whose free end is adapted to be engaged by a second, substantially horizontally extending arm 25b of the lever 25. A screw 32, which is provided with a suitable lock nut 33, is threaded through the lever and indicator supporting bracket 27 so as to be moved into engagement with the short arm 25b of the lever 25 and thus swing the yoke arm 25a thereof against the tension of the spring 28 out of engagement with the pins 24 on the thrust ring 20. The axially movable stem 31 of the indicator 30 actuates a hand or pointer 34 that moves across the indicator dial 35 which is graduated to indicate in inch-pounds the amount of torsional resistance.

By the arrangement described, power is transmitted from the drive shaft 1 to the driven shaft 2 through the torque coupling 3 and, when the load on the driven shaft is sufficient to distort the torsion coil spring element 6 of said coupling, the driving end portion 4 thereof is rotated relative to the driven end portion 5 thereof and the sleeve 11 and collar 13 which rotate with said driven end portion, whereby an axially sliding movement is imparted to said collar due to the engagement of the pin 18 thereof with the oblique cam groove 17 in said driving end portion of said coupling.

This endwise sliding movement of the collar 13 causes the trunnions 24 of the thrust ring 20, which moves with said collar, to press against the yoke arm 25a of the lever 25 and cause the short arm 25b thereof to actuate the plunger 31 of the indicator 30 and move the pointer 34 thereof over the dial and indicate in inch-pounds the power of torque transmitted.

The hereinbefore described device has several advantages. The forming of the torsional spring element 6 integral with the shaft receiving ends of the coupling 3 tends to hold the two ends thereof in axial alinement and thus prevent whipping of the shaft ends at high speed. This one-piece torque coupling facilitates calibration, as it is only necessary to fasten one end of the coupling to a stationary shaft and rotate the other end with various known pressures and then mark the corresponding torque readings on the dial of the indicator. In the event of breakage of the spring of the torque coupling, the operator is protected from flying fragments by the sleeve 11 which completely encloses said spring. The thrust ring 20 may be quickly and easily mounted on and dismounted from the collar 13; it is accurately located on said collar between the shoulder 21 thereof and the retaining ring 22; and it is prevented from turning on said collar by ends of the yoke arm 25a of the lever 25. Endwise movement of said collar is transmitted to the indicator by a single lever, thereby eliminating lost motion and lag in indicating load variations; and the set screw 32 that engages the short arm 25b of the dial operating lever enables said lever to be disengaged from the pins 24 on the thrust ring 20 after the torque readings have been taken, thereby preventing undue wear on the indicator parts due to fluctuations in the coupling.

What I claim is:

1. A torsion dynamometer comprising a self-contained torque coupling having tubular shaft receiving end portions permanently connected by an intermediate helical coil spring portion, a sleeve surrounding but spaced from the spring portion of said coupling, one end of said sleeve being supported directly on and rigidly secured to one of said shaft receiving end portions and the other end of said sleeve being supported directly on and unsecured to the other of said shaft receiving end portions, a collar sleeved on said other shaft receiving end portion and having an axially slidable but non-rotary connection with said unsecured end of said sleeve, a connection between said collar and said other shaft receiving end portion adapted upon relative rotary movement thereof to impart an endwise sliding movement to said collar, and an indicating device operatively connected to said collar to be actuated by the endwise sliding movement thereof.

2. A torsion dynamometer comprising a self-contained torque coupling having tubular shaft receiving end portions integrally connected by an intermediate helical coil spring portion, a sleeve surrounding but spaced from said helical coil spring portion, one end of said sleeve being supported directly on and rigidly secured to one of said shaft receiving end portions and the other end of said sleeve being supported directly on but unsecured to the other of said shaft receiving end portions, a collar supported on said other shaft receiving end portion and having a counterbored portion adapted to receive said unsecured end of said sleeve, said counterbored portion of said collar having an axially slidable but non-rotary connection with said unsecured end of said sleeve, said other shaft receiving end portion having an obliquely disposed groove in its collar supporting surface, a pin fixed to said collar and cooperating with said groove, whereby relative rotary movement of said other shaft receiving end portion and said collar imparts an endwise sliding movement to the latter, and an indicator cooperating with said collar and adapted to be actuated by the endwise sliding movement thereof.

3. A torsion dynamometer comprising a torque coupling having shaft receiving end portions integrally connected by an intermediate torsion coil spring portion, a sleeve surrounding the spring portion of said coupling with its ends supported directly on the shaft receiving end portions of said coupling, said sleeve being secured to one only of said shaft receiving end portions, a collar mounted on the other shaft receiving end portion of said coupling and having an axial sliding but non-rotary connection with the adjacent free end of said sleeve, said other shaft receiving end portion being provided in its collar supporting surface with an obliquely disposed groove, a pin fixed to said collar and cooperating with said groove, a ring mounted on said collar and provided with outstanding trunnions, an indicating device, and a lever having one arm adapted to be actuated by said trunnions and another arm adapted to actuate said indicating device.

4. A torsion dynamometer comprising a torque coupling having shaft receiving end portions connected by an intermediate torsion coil spring portion, a sleeve surrounding the spring portion of said coupling with its ends supported on the shaft receiving end portions of said coupling, said sleeve being secured to one only of said shaft receiving end portions, a collar mounted on the other shaft receiving end portion of said coupling and having a counterbored portion having an axial sliding but non-rotary connection with the adjacent free end of said sleeve, said other shaft receiving end portion being provided in its collar supporting surface with an obliquely disposed groove, a pin fixed to said collar and cooperating with said groove, a thrust ring mounted on said collar and provided with outstanding trunnions, an indicating device, a ring mounted on said collar for retaining said thrust ring thereon, a lever having a yoke arm adapted to be actuated by said trunnions and another arm adapted to actuate said indicating device, and a spring for yieldably holding said yoke arm of said lever in engagement with said trunnions.

5. A torsion dynamometer comprising a torque coupling comprising shaft receiving end portions integrally connected by an intermediate torsion coil spring portion, a sleeve surrounding the spring portion of said coupling with its ends supported on the shaft receiving end portions of said coupling, said sleeve being secured to one only of said shaft receiving end portions, a collar mounted on the other shaft receiving end portion of said coupling and having a counterbored portion adapted to receive the adjacent free end portion of said sleeve, an axial sliding but non-rotary connection between said end portion of said sleeve and said counterbored portion of said collar, said other shaft receiving end portion being provided in its collar supporting surface with an obliquely disposed groove, a pin fixed to said collar and cooperating with said groove, a thrust ring mounted on said collar against axial movement thereon and provided with outstanding trunnions, an indicating device, a lever having a yoke arm adapted to be actuated in one direction only by said trunnions and another arm adapted to actuate said indicating device, a spring for yieldably holding said yoke arm in engagement with said trunnions, and means for swinging said yoke arm clear of said trunnions.

PAUL KLAMP.